US011781482B2

(12) United States Patent
Summers

(10) Patent No.: US 11,781,482 B2
(45) Date of Patent: Oct. 10, 2023

(54) HEAT SHIELD ASSEMBLY FOR USE WITH AN AIRCRAFT ENGINE

(71) Applicant: The Boeing Company, Chicago, IL (US)

(72) Inventor: John F. Summers, Seattle, WA (US)

(73) Assignee: The Boeing Company, Arlington, VA (US)

( * ) Notice: Subject to any disclaimer, the term of this patent is extended or adjusted under 35 U.S.C. 154(b) by 74 days.

(21) Appl. No.: 17/465,959

(22) Filed: Sep. 3, 2021

(65) Prior Publication Data

US 2023/0071244 A1    Mar. 9, 2023

(51) Int. Cl.
| | | |
|---|---|---|
| *F02C 7/20* | (2006.01) | |
| *B64D 27/18* | (2006.01) | |
| *B64D 29/02* | (2006.01) | |
| *B64D 33/04* | (2006.01) | |
| *F02C 7/24* | (2006.01) | |

(52) U.S. Cl.
CPC ............... *F02C 7/20* (2013.01); *B64D 27/18* (2013.01); *B64D 29/02* (2013.01); *B64D 33/04* (2013.01); *F02C 7/24* (2013.01); *F05D 2220/323* (2013.01); *F05D 2260/231* (2013.01)

(58) Field of Classification Search
CPC ........ B64D 29/02; B64D 33/04; B64D 27/12; B64D 27/18; F02C 7/20; F02C 7/24
See application file for complete search history.

(56) References Cited

U.S. PATENT DOCUMENTS

| 4,712,750 A | * | 12/1987 | Ridgwell | F02K 1/52 244/54 |
|---|---|---|---|---|
| 5,524,846 A | * | 6/1996 | Shine | F02K 1/805 60/796 |
| 6,829,883 B2 | * | 12/2004 | Sathianathan | F16B 5/02 403/150 |
| 7,121,758 B2 | * | 10/2006 | McMillan | F01D 21/045 403/336 |

(Continued)

FOREIGN PATENT DOCUMENTS

| EP | 3275788 A1 | 1/2018 |
|---|---|---|
| WO | 2014135948 A3 | 9/2014 |

OTHER PUBLICATIONS

Extended European Search Report issued in European Application No. 22180057.6, dated Dec. 5, 2022. pp. 1-7.

*Primary Examiner* — Craig Kim
(74) *Attorney, Agent, or Firm* — Armstrong Teasdale LLP

(57) ABSTRACT

A heat shield assembly for use with an aircraft engine. The heat shield assembly includes a structural member, a heat shield panel adapted for exposure to aircraft engine exhaust, an index joint coupling the heat shield panel to the structural member in a fixed positional location, and a plurality of slip joints coupling the heat shield panel to the structural member. Each slip joint includes at least one wear buffer coupled to the heat shield panel, and a slip fastener insertable through a slip joint hole in the heat shield panel with a clearance fit. A gap defined by the clearance fit is sized to provide a tolerance for expansion and contraction of the heat shield panel relative to the fixed positional location, and the at least one wear buffer is engageable by the slip fastener during expansion and contraction of the heat shield panel.

20 Claims, 4 Drawing Sheets

(56) References Cited

U.S. PATENT DOCUMENTS

| | | | | |
|---|---|---|---|---|
| 7,581,301 | B2* | 9/2009 | Arbona | F16B 5/0241 |
| | | | | 29/525.02 |
| 8,118,252 | B2* | 2/2012 | Dumont | B64D 33/04 |
| | | | | 248/556 |
| 8,662,440 | B2* | 3/2014 | Journade | A61P 29/00 |
| | | | | 248/556 |
| 8,844,862 | B2* | 9/2014 | Journade | B64D 29/02 |
| | | | | 244/54 |
| 9,688,412 | B2* | 6/2017 | Peyruseigt | B64D 27/26 |
| 10,260,540 | B2* | 4/2019 | Connelly | F16B 5/0088 |
| 10,385,730 | B2* | 8/2019 | Acius | F01D 25/28 |
| 11,111,881 | B2* | 9/2021 | Goudard | F02K 1/76 |
| 11,427,298 | B2* | 8/2022 | Cromer | B64C 1/38 |
| 2003/0201366 | A1* | 10/2003 | Connelly | B64D 29/02 |
| | | | | 244/121 |
| 2008/0178465 | A1 | 7/2008 | Schiavo et al. | |
| 2009/0095443 | A1* | 4/2009 | Connelly | B64D 29/02 |
| | | | | 428/157 |
| 2009/0200418 | A1* | 8/2009 | Beaufort | B64D 27/26 |
| | | | | 244/54 |
| 2009/0212184 | A1* | 8/2009 | Bourgeois | F16M 11/2064 |
| | | | | 248/295.11 |
| 2010/0051743 | A1* | 3/2010 | Dumont | B64D 29/02 |
| | | | | 244/54 |
| 2011/0155847 | A1* | 6/2011 | Journade | A61P 25/28 |
| | | | | 244/54 |
| 2013/0105622 | A1* | 5/2013 | Journade | B64C 7/02 |
| | | | | 244/54 |
| 2018/0016019 | A1 | 1/2018 | Ramlaoui | |
| 2018/0057140 | A1 | 3/2018 | Connelly et al. | |
| 2021/0078693 | A1 | 3/2021 | Cromer et al. | |
| 2022/0128005 | A1* | 4/2022 | Smith | F01D 1/026 |
| 2022/0221484 | A1* | 7/2022 | Fewless | G01F 1/42 |

\* cited by examiner

HEAT SHIELD ASSEMBLY FOR USE WITH AN AIRCRAFT ENGINE

FIELD

The field relates generally to heat shields and, more specifically, to heat shields for aircraft engines that enable thermal expansion and contraction.

BACKGROUND

Aircraft engines are typically supported on or coupled to an aircraft structure, such as a wing, with pylons. At least some known pylons include a support structure that supports the engine, and an aerodynamic fairing extending from the support structure. Some fairings are located aft of the engine such that a lower skin panel of the fairing may be exposed to exhaust gas discharged from the engine during operation thereof. Exposure to the exhaust gas use may cause the lower skin panel to undergo thermal expansion and contraction. Existing skin panels are generally continuously fastened to the support structure and to other skin panels with rivets. Temperature gradients may be formed across the fairing as the hotter lower skin panel is restrained by comparatively cooler side skin panels of the fairing. Thus, thermal cycling from exposure to the exhaust gas and subsequent cooling can repeatedly cause high stress to the fairing.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is a heat shield assembly for use with an aircraft engine. The heat shield assembly includes a structural member, a heat shield panel adapted for exposure to aircraft engine exhaust, an index joint coupling the heat shield panel to the structural member in a fixed positional location, and a plurality of slip joints coupling the heat shield panel to the structural member. Each slip joint includes at least one wear buffer coupled to the heat shield panel, and a slip fastener insertable through a slip joint hole in the heat shield panel with a clearance fit. A gap defined by the clearance fit is sized to provide a tolerance for expansion and contraction of the heat shield panel relative to the fixed positional location, and the at least one wear buffer is engageable by the slip fastener during expansion and contraction of the heat shield panel.

Another aspect is a heat shield assembly for use with an aircraft engine. The heat shield assembly includes a structural member, a heat shield panel adapted for exposure to aircraft engine exhaust, and a plurality of slip joints coupling the heat shield panel to the structural member. Each slip joint includes at least one wear buffer coupled to the heat shield panel, and a slip fastener insertable through a slip joint hole in the heat shield panel with a clearance fit. A gap defined by the clearance fit is sized to provide a tolerance for thermal movement of the heat shield panel relative to the structural member, and the at least one wear buffer is engageable by the slip fastener during thermal movement of the heat shield panel.

Yet another aspect is an aircraft. The aircraft includes an engine configured to discharge exhaust, a heat shield panel positioned for exposure to aircraft engine exhaust, and a plurality of slip joints coupling the heat shield panel onto the aircraft. Each slip joint includes at least one wear buffer coupled to the heat shield panel, and a slip fastener insertable through a slip joint hole in the heat shield panel with a clearance fit. A gap defined by the clearance fit is sized to provide a tolerance for thermal movement of the heat shield panel relative to the slip fastener, and the at least one wear buffer is engageable by the slip fastener during thermal movement of the heat shield panel.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
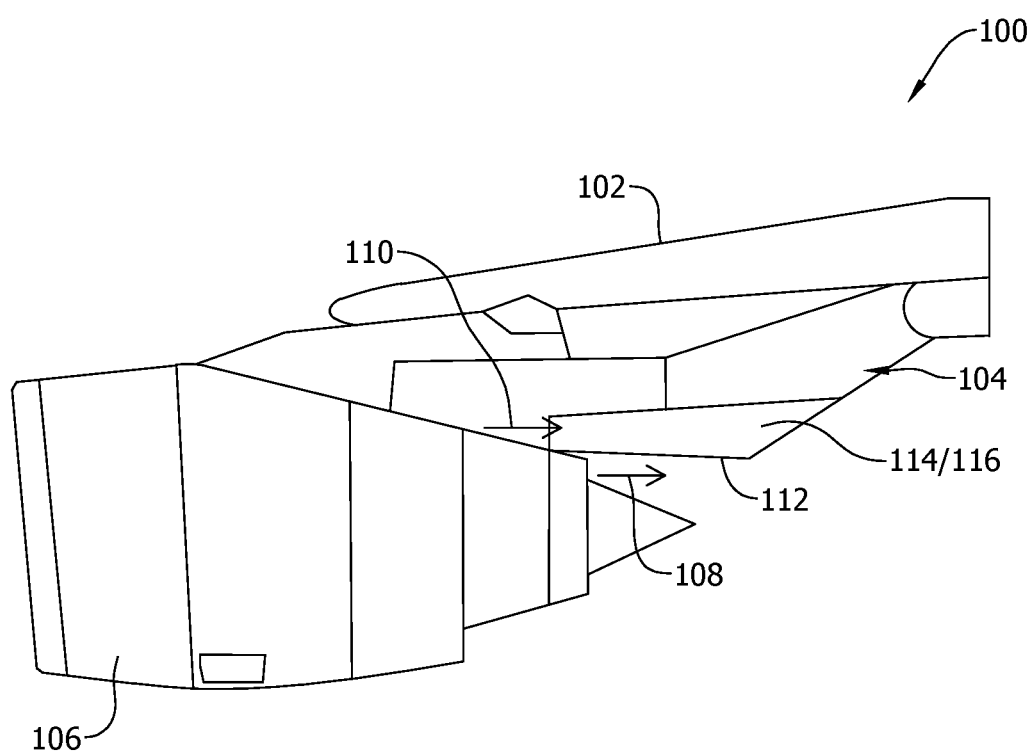
FIG. 1 is a side view illustration of an example aircraft engine support structure.

FIG. 1 is a side view of an example aircraft engine support structure 100. Support structure 100 includes a wing 102, a pylon 104 extending from wing 102, and an engine 106 is coupled to pylon 104. In operation, engine 106 discharges primary exhaust 108 and fan exhaust 110 therefrom. Primary exhaust 108 is comparatively hotter than fan exhaust 110. Pylon 104 includes a heat shield panel 112 and a side skin panel 114 extending from heat shield panel 112. Heat shield panel 112 is positioned on an underside of pylon 104, and is positioned aft of engine 106. Accordingly, heat shield panel 112 is generally positioned for exposure to primary exhaust 108, and side skin panel 114 is generally positioned for exposure to fan exhaust such that a thermal gradient is formed therebetween. In an alternative implementation, heat shield panel 112 is positioned in any location on an aircraft exposed to aircraft engine exhaust.

Figure 2:
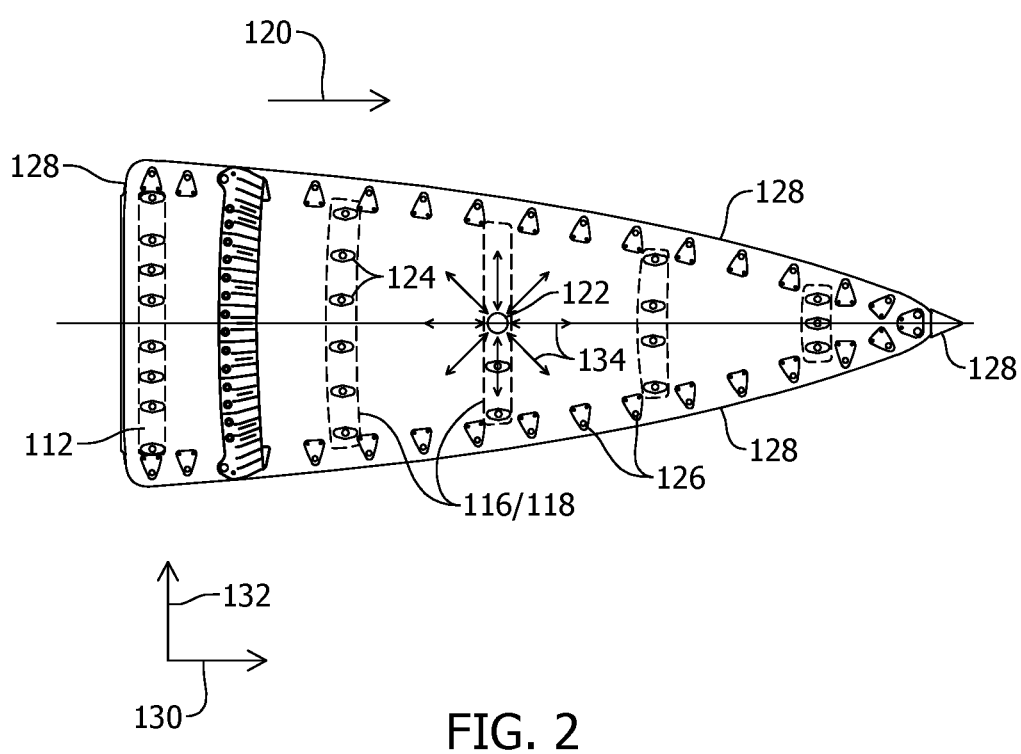
FIG. 2 is a schematic illustration of a heat shield panel that may be used in the aircraft engine support structure shown in FIG. 1.

FIG. 2 is a schematic of heat shield panel 112. Heat shield panel 112 is coupled to side skin panel 114, and also to a substructure 116 of aircraft engine support structure 100. Substructure 116 may include any component of aircraft engine support structure 100 that enables the heat shield assembly to function as described herein. In the illustrated example, substructure 116 includes one or more frame members 118 within pylon 104 (shown in FIG. 1). Frame members 118 extend between wing 102 (shown in FIG. 1) and heat shield panel 112, are arranged in a spaced relationship relative to an exhaust flow direction 120, and are oriented generally orthogonally relative to exhaust flow direction 120. Substructure 116 may also include side skin panel 114 of pylon 104.

Heat shield panel 112 may be coupled to substructure 116 with an index joint 122, a plurality of first slip joints 124, and a plurality of second slip joints 126 in a fastening pattern that enables heat shield panel 112 to thermally expand and contract to reduce stress. For example, index joint 122 couples heat shield panel 112 to a frame member 118 in a fixed positional location. Index joint 122 may include any suitable fastener that limits or eliminates movement of heat shield panel 112 relative to frame member 118. In one embodiment, index joint 122 is generally centrally located on heat shield panel 112. In other words, index joint 122 is spaced generally equidistant from opposing side edges 128 of heat shield panel 112 relative to at least a longitudinal axis 130 and a lateral axis 132 of heat shield panel 112. Accordingly, thermal movement 134 of heat shield panel 112 is controlled relative to index joint 122. More specifically, thermal movement 134 of heat shield panel 112 extends generally inward and outward relative to index joint 122.

First slip joints 124 couple heat shield panel 112 to a respective frame member 118, and second slip joints 126 couple heat shield panel 112 to side skin panel 114 inboard of side edges 128. As will be described in more detail below, slip joints 124 and 126 provide a tolerance for heat shield panel 112 to expand and contract relative to the fixed positional location of index joint.

Figure 3:
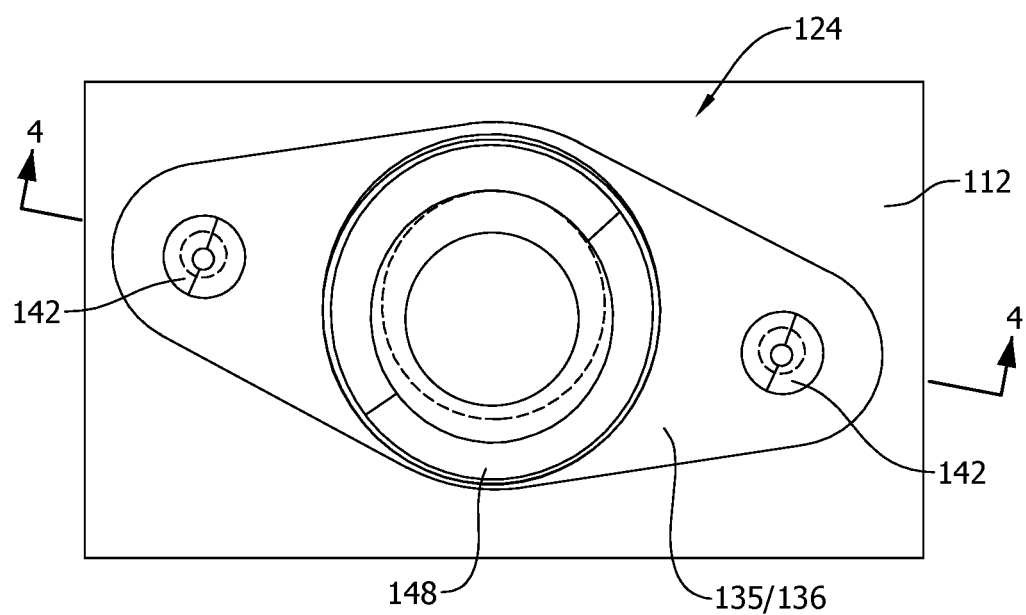
FIG. 3 is an enlarged view of an example slip joint that may be used on the heat shield panel shown in FIG. 2.
Figure 4:
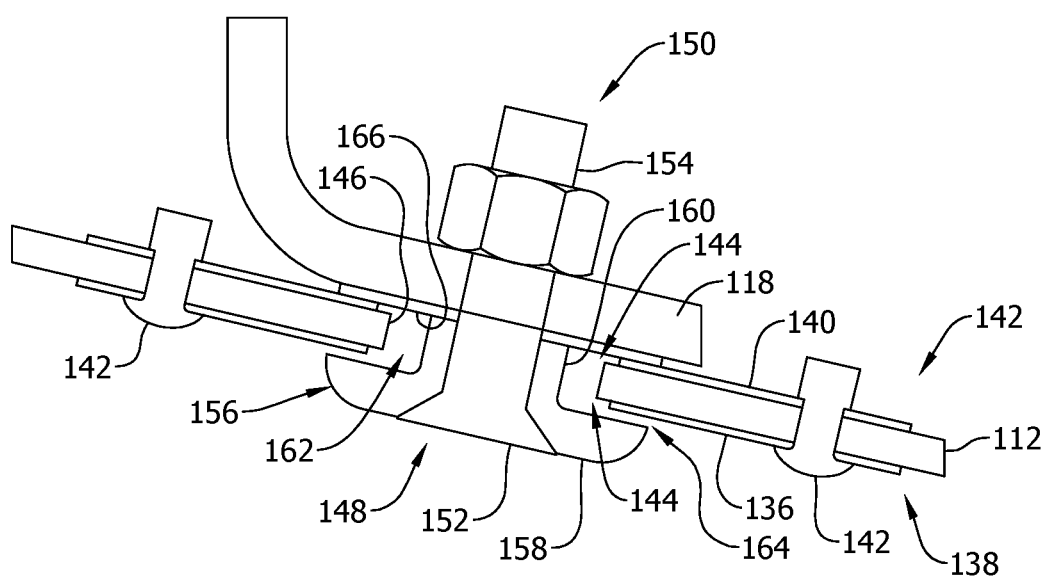
FIG. 4 is a cross-sectional view of the slip joint shown in FIG.

FIGS. 3 and 4 illustrate first slip joint 124. First slip joint 124 includes at least one wear buffer 135 coupled to heat shield panel 112. In the illustrated embodiment, the at least one wear buffer 135 includes a first wear pad 136 on a first side 138 of heat shield panel 112, and a second wear pad 140 on a second side 142 of heat shield panel 112 between frame member 118 and heat shield panel 112. Wear pads 136 and 140 are coupled to heat shield panel 112, in a fixed position, with fasteners 142 such as rivets. The shape of wear pads 136 and 140 is determined by the locations of fasteners 142. The locations of fasteners 142 are chosen so that fasteners 142 will not interfere or intersect with frame member 118. Each wear pad 136 and 140 has an opening 144 defined therein, and heat shield panel 112 has a slip joint hole 146 defined therein at respective slip joint locations. Each opening 144 is aligned with slip joint hole 146 to enable a slip fastener 148 to be insertable therethrough.

Slip fastener 148 includes a bolt 150 having a head portion 152 and a body portion 154 extending therefrom. In the example embodiment, body portion 154 couples to frame member 118, and head portion 152 has a wear spacer 156 coupled thereto. Wear spacer 156 has an engagement portion 158 and a sleeve portion 160 extending along body portion 154 of bolt 150. Body portion 154 and/or sleeve portion 160 are undersized relative to slip joint hole 146 such that slip fastener 148 is insertable therein with a clearance fit. A clearance gap 162 defined by the clearance fit provides space for limited movement of slip fastener 148 therein, such as when heat shield panel 112 moves relative to slip fastener 148. Accordingly, clearance gap 162 provides a tolerance for expansion and contraction of heat shield panel 112 relative to the fixed positional location. In addition, engagement portion 158 is sized larger than slip joint hole 146 and openings 144 in wear pads 136 and 140 to enable engagement portion 158 to extend across at least a portion of first wear pad 136, as will be described in more detail below.

In addition, slip fastener 148 secures heat shield panel 112 to frame member 118 in a manner that enables the expansion and contraction to occur. For example, a nominal gap 164 may be defined between engagement portion 158 and first wear pad 136 such that a friction fit is defined therebetween. First slip joint 124 also includes a wear washer 166 between frame member 118 and second wear pad 140. Accordingly, in operation, engagement portion 158 and wear washer 166 frictionally engage a respective wear pad 136 or 140 as heat shield panel 112 expands and contracts.

In the illustrated embodiment, slip fastener 148 is centrally located within slip joint hole 146. Alternatively, slip joint hole 146 may be defined within heat shield panel 112 to positionally offset slip fastener 148 therein. For example, slip joint hole 146 may be offset at a "cold" position to account for the projected directional thermal movement 134 (i.e., expansion) as shown in FIG. 2.

The wear components (e.g., wear buffers 135, slip fastener 148 or one or more parts thereof, and wear washer 166) of first slip joint 124 are fabricated from any material that enables the heat shield assembly to function as described herein. The wear material should be wear-resistant at high temperatures (e.g., greater than 1,000° F.). An example wear material includes, but is not limited to including, a nickel-based alloy material, a chrome carbide material, and a tungsten carbide material. Heat shield panel 112 may be fabricated from any suitable material, such as titanium.

Figure 5:
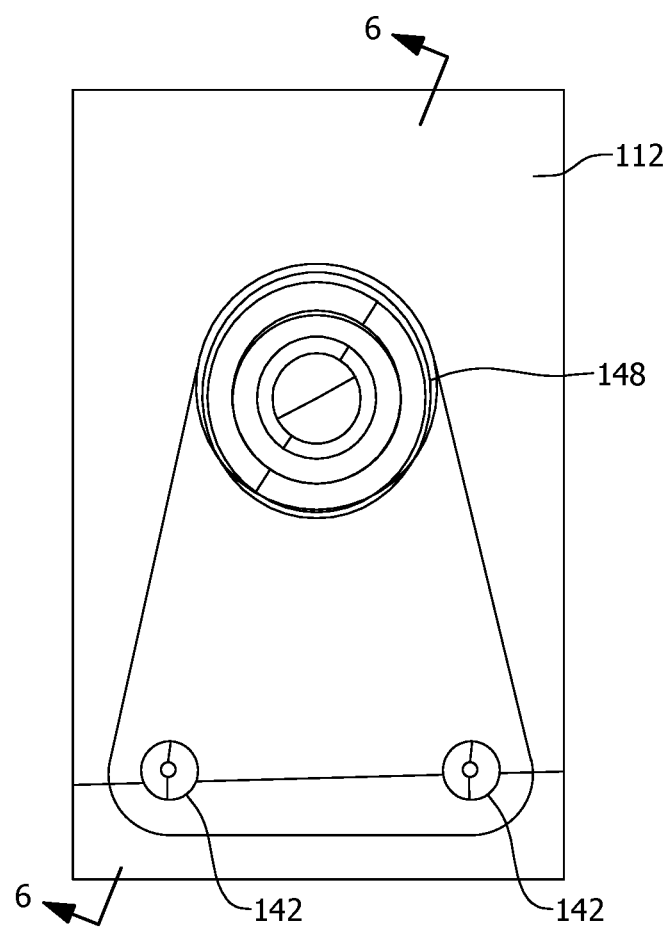
FIG. 5 is an enlarged view of another example slip joint that may be used on the heat shield panel shown in FIG. 2.
Figure 6:
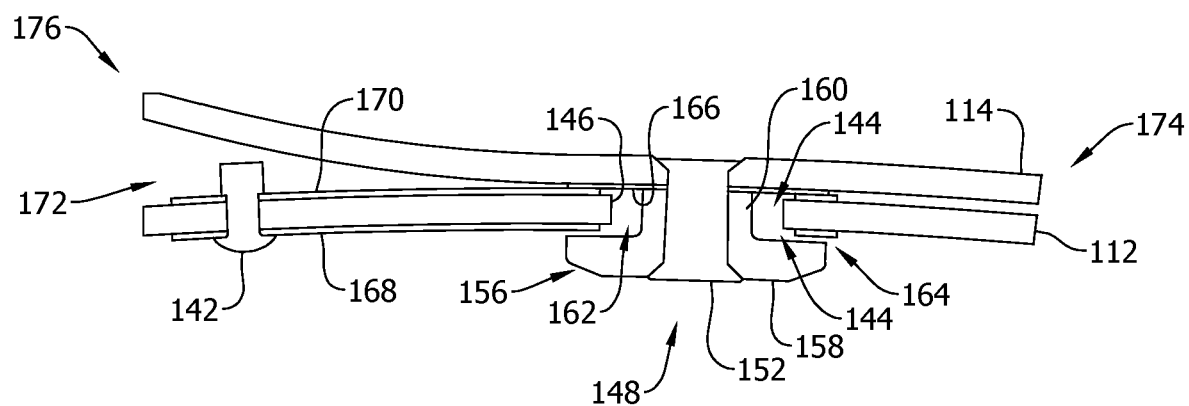
FIG. 6 is a cross-sectional view of the slip joint shown in FIG.

FIGS. 5 and 6 illustrate second slip joint 126. In the illustrated embodiment, first and second wear pads 168 and 170 of second slip joint 126 have any shape that facilitates reducing or eliminating interference between fasteners 142 and side skin panel 114. For example, as shown in FIG. 6, a panel gap 172 between heat shield panel 112 and side skin panel 114 on an outboard side 174 of heat shield panel 112 may not provide sufficient clearance for fasteners 142. Accordingly, wear pads 168 and 170 are shaped and oriented to enable fasteners 142 to be positioned on an inboard side 176 of heat shield panel 112 where panel gap 172 is larger as compared to on outboard side 174.

Figure 7:
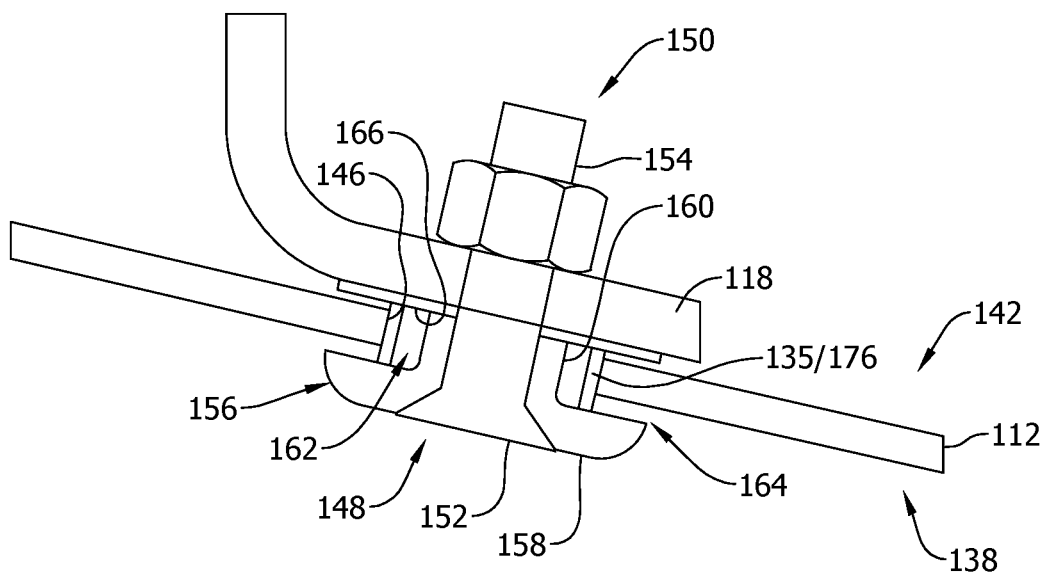
FIG. 7 is a cross-sectional view of another example slip joint that may be used on the heat shield panel shown in FIG. 2.

FIG. 7 is a cross-sectional view of another example slip joint that may be used on heat shield panel 112. In the illustrated embodiment, the at least one wear buffer 135 includes a wear bushing 176 coupled to heat shield panel 112. More specifically wear bushing 176 is undersized relative to slip joint hole 146, and is positioned within slip joint hole 146 with a press fit. Thus, wear bushing 176 is in a fixed position within slip joint hole 146, and provides sliding contact from a surface thereof that is frictionally engaged by slip fastener 148 as heat shield panel 112 moves relative to frame member 118 and slip fastener 148. In some embodiments, at least a portion of wear bushing 176 protrudes from heat shield panel 112 to engage slip fastener 148 and/or wear washer 166 in the sliding contact.

Figure 8:
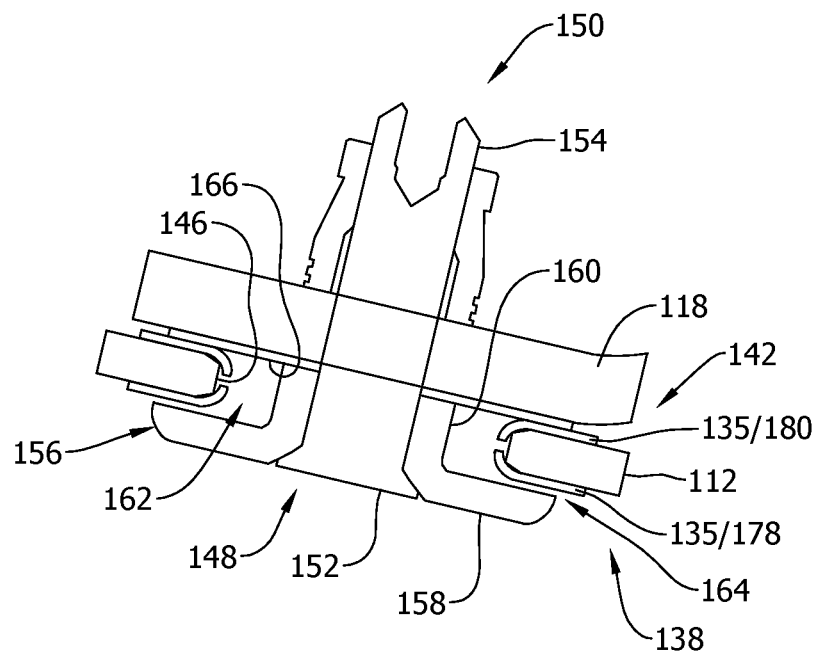
FIG. 8 is a cross-sectional view of another example slip joint that may be used on the heat shield panel shown in FIG. 2.

FIG. 8 is a cross-sectional view of another example slip joint that may be used on heat shield panel 112. In the illustrated embodiment, the at least one wear buffer 135 includes a first wear washer 178 on a first side 138 of heat shield panel 112, and a second wear washer 180 on a second side 142 of heat shield panel 112 between frame member 118 and heat shield panel 112. Wear washers 178 and 180 are coupled to heat shield panel 112 in a fixed position using any suitable fastening means. For example, wear washers 178 and 180 may be mechanically forced or swaged into position within slip joint hole 146. Thus, at least a portion of each wear washer 178 and 180 are forced into slip joint hole 146 to affix wear washers 178 and 180 to heat shield panel 112. Wear washers 178 and 180 therefore provide sliding contact from a surface thereof that is frictionally engaged by slip fastener 148 as heat shield panel 112 moves relative to frame member 118 and slip fastener 148.

Accordingly, in the embodiments illustrated in FIGS. 7 and 8, the various wear buffers 135 used are coupled to heat shield panel 112 without the use of additional fasteners, thereby reducing the weight of the assembly and reducing aerodynamic drag during flight operations.

Examples described include an engine fairing heat shield with the lower surface connected to an upper support structure with slip joints. The slip joints allow the hotter, lower surface to expand freely about a central location as it is exposed to engine exhaust flow. The slip joints are constructed of a nickel material to protect the surrounding structure from damage. In addition, the nickel material has excellent wear resistance even at high operational temperatures. The slip joint design is fitted with a clearance tolerance that allows the heat shield panel to move relative to the support structure while minimizing free play "chatter" behavior. Connecting the heat shield panel to the support structure at the fixed central location controls directional expansion and contraction of the heat shield, which enables a reduced tolerance to be provided at each slip joint. Accordingly, the examples described reduce high mechanical loads and stresses caused by exposure of the heat shield panel to the primary engine exhaust flow try.

As used herein, an element or step recited in the singular and preceded with the word "a" or "an" should be understood as not excluding plural elements or steps, unless such exclusion is explicitly recited. Furthermore, references to "example", "example implementation" or "one implementation" of the present disclosure are not intended to be interpreted as excluding the existence of additional implementations that also incorporate the recited features.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. A heat shield assembly for use with an aircraft engine, the heat shield assembly comprising:
    a structural member;
    a heat shield panel adapted for exposure to aircraft engine exhaust;
    an index joint coupling the heat shield panel to the structural member in a fixed positional location; and
    a plurality of slip joints coupling the heat shield panel to the structural member, each slip joint comprising:
        at least one wear buffer coupled to the heat shield panel; and
        a slip fastener insertable through a slip joint hole in the heat shield panel with a clearance fit, wherein a gap defined by the clearance fit is sized to provide a tolerance for expansion and contraction of the heat shield panel relative to the fixed positional location, and wherein the at least one wear buffer is engageable by the slip fastener during expansion and contraction of the heat shield panel.

2. The heat shield assembly in accordance with claim 1, wherein the index joint is centrally located on the heat shield panel.

3. The heat shield assembly in accordance with claim 1, wherein the at least one wear buffer comprises a wear bushing coupled within the slip joint hole.

4. The heat shield assembly in accordance with claim 3 further comprising a wear washer between the structural member and the wear bushing.

5. The heat shield assembly in accordance with claim 4, wherein the slip fastener is coupled to the at least one wear buffer with a friction fit to enable the expansion and contraction of the heat shield panel.

6. The heat shield assembly in accordance with claim 1, wherein the heat shield panel is formed from titanium.

7. A heat shield assembly for use with an aircraft engine, the heat shield assembly comprising:
    a structural member;
    a heat shield panel adapted for exposure to aircraft engine exhaust; and
    a plurality of slip joints coupling the heat shield panel to the structural member, each slip joint comprising:
        at least one wear buffer coupled to the heat shield panel; and
        a slip fastener insertable through a slip joint hole in the heat shield panel with a clearance fit, wherein a gap defined by the clearance fit is sized to provide a tolerance for thermal movement of the heat shield panel relative to the structural member, and wherein the at least one wear buffer is engageable by the slip fastener during thermal movement of the heat shield panel.

8. The heat shield assembly in accordance with claim 7 further comprising an index joint coupling the heat shield panel to the structural member in a fixed positional location, wherein the thermal movement is defined by expansion and contraction of the heat shield panel relative to the fixed positional location.

9. The heat shield assembly in accordance with claim 8, wherein the index joint is centrally located on the heat shield panel.

10. The heat shield assembly in accordance with claim 7, wherein the at least one wear buffer comprises a wear bushing coupled within the slip joint hole.

11. The heat shield assembly in accordance with claim 10 further comprising a wear washer between the structural member and the wear bushing.

12. The heat shield assembly in accordance with claim 7, wherein the slip fastener is coupled to the at least one wear buffer with a friction fit to enable the thermal movement of the heat shield panel.

13. The heat shield assembly in accordance with claim 7, wherein the heat shield panel is formed from titanium.

14. An aircraft comprising:
    an engine configured to discharge exhaust;
    a heat shield panel positioned for exposure to aircraft engine exhaust; and
    a plurality of slip joints coupling the heat shield panel onto the aircraft, wherein each slip joint comprises:

at least one wear buffer coupled to the heat shield panel; and a slip fastener insertable through a slip joint hole in the heat shield panel with a clearance fit, wherein a gap defined by the clearance fit is sized to provide a tolerance for thermal movement of the heat shield panel relative to the slip fastener, and wherein the at least one wear buffer is engageable by the slip fastener during thermal movement of the heat shield panel.

15. The aircraft in accordance with claim 14 further comprising a wing and a pylon extending from the wing, wherein the heat shield panel defines a skin panel of an aft fairing section of the pylon.

16. The aircraft in accordance with claim 15 further comprising a structural member extending from the wing, wherein the structural member and the heat shield panel are coupled together with the slip fastener.

17. The aircraft in accordance with claim 16, wherein the structural member is one of a frame member extending from the wing, or a side skin panel of the aft fairing section extending from the heat shield panel.

18. The aircraft in accordance with claim 14 further comprising an index joint coupling the heat shield panel onto the aircraft in a fixed positional location, wherein the thermal movement is defined by expansion and contraction of the heat shield panel relative to the fixed positional location.

19. The aircraft in accordance with claim 18, wherein the index joint is centrally located on the heat shield panel.

20. The aircraft in accordance with claim 14, wherein the slip fastener is coupled to the at least one wear buffer with a friction fit to enable the thermal movement of the heat shield panel.

* * * * *